United States Patent [19]

Yoshinaga

[11] Patent Number: 5,568,929
[45] Date of Patent: Oct. 29, 1996

[54] TEMPERATURE COMPENSATIONS SEAL

[75] Inventor: Jay K. Yoshinaga, Gardena, Calif.

[73] Assignee: Rockwell International Corporation, Seal Beach, Calif.

[21] Appl. No.: 416,116

[22] Filed: Apr. 3, 1995

[51] Int. Cl.⁶ .................................................. F16J 15/46
[52] U.S. Cl. ............................ 277/26; 277/164; 277/190; 277/191; 277/205
[58] Field of Search .............................. 277/26, 117–122, 277/164, 190, 191, 235 A, 236, 901, 205

[56] References Cited

U.S. PATENT DOCUMENTS

| | | | |
|---|---|---|---|
| 3,140,342 | 7/1964 | Ehrreich et al. | 277/901 |
| 3,207,523 | 9/1965 | Johnson | 277/190 |
| 3,279,806 | 10/1966 | Bailkowski | 277/236 |
| 3,371,946 | 3/1968 | Bleyle, Jr. et al. | 277/26 |
| 3,411,812 | 11/1968 | Prince et al. | 277/26 |
| 3,567,258 | 3/1971 | Scarmucci | 277/236 |

OTHER PUBLICATIONS

H. Hugo Buchter: "Industrial Sealing Technology"; Jul 1986; pp. 57, 58, 82, 84–87, 349, 350.

William A. Prince: "Bi,etallic seal solves cryogenic sealing problems"; Hydraulics & Pneumatics; Nov. 1964; pp. 105–109.

"Metal V–Seals Mark II", Parker Seal Company; Mar. 1969, p. 5.

*Primary Examiner*—Scott Cummings
*Attorney, Agent, or Firm*—George A. Montanye; Harry B. Field; Terrell P. Lewis

[57] ABSTRACT

A temperature-responsive actuator for a sealing assembly comprises first and second annular members each having a camming surface for engagement with one another, the first and second annular members being positioned against each other so that they are nested and together exhibit a height "h" at ambient temperatures, the first annular member having a coefficient of thermal contraction less than the coefficient of thermal contraction of the second annular member so that when the thermal actuator is subjected to temperatures less than ambient temperatures, the first and second annular members contract different amounts such that the "effective" height of the actuator becomes "h+▲h".

11 Claims, 2 Drawing Sheets

TEMPERATURE COMPENSATIONS SEAL

BACKGROUND OF THE INVENTION

1. Field of the Invention

The present invention relates to thermally responsive sealing assemblies, and more particularly to a temperature responsive sealing assembly for effecting a fluid tight seal between fluid containing members, the assembly including thin nested actuators, each having a unique coefficient of thermal contraction and possessing a cam surface positioned for camming engagement with a corresponding cam surface on a neighboring actuator for altering the overall physical dimensions of the assembly in response to temperature changes.

2. Description of the Related Art

In the past, a variety of seals capable of functioning effectively at ambient temperatures, as temperatures above ambient temperature, were well-known.

However, finding a seal which functioned below, as well as at, ambient temperature posed a major problem due to the fact that materials of which resilient seals could be composed had characteristics that were detrimental to the sealing efficiency as the temperature decreased.

For example, the shrinking of a sealing ring caused by exposure to extreme cold temperatures, as encountered in cryogenic applications where the temperatures range well below $-200°$ F. created a tendency for the sealing ring to pull away from the walls of the members between which the ring was disposed, unless the sealing ring was preloaded into sealing engagement with sufficient force to resist the inherent shrinkage. However, such preloading was detrimental to the sealing ring when operating at ambient temperature or subambient temperature.

OBJECTS OF THE INVENTION

In view of the foregoing, it is an object of the present invention to provide a sealing assembly having elements which respond to changes in temperature to alter the overall physical dimensions of the assembly and thereby vary the force which loads surfaces of the sealing assembly against a component on which the sealing assembly surfaces bear.

Another object of the present invention is to provide a seal that is responsive to temperature changes such that the seal is initially preloaded into sealing engagement with the walls of a component so as to effective a seal at an ambient temperature, whereas in response to a reduction in temperature the seal is progressively more forcefully loaded into sealing contact with the walls of the component.

Still another object of the present invention is to provide a thermally responsive actuator which when exposed to subambient temperatures effects an increase in the overall dimensions of the actuator, and which can be housed in a jacket configured as, or covered with a material that can be used as, a seal, an electrical contact of a switch, or as a means for maintaining electrical circuit continuity.

These and other objects are accomplished through the use of a temperature-responsive actuator assembly disposed within a non-metallic covering. In one embodiment, the covering comprises a plastic jacket or flexible housing. The assembly includes two rings of substantially the same diameter, each having a camming surface positioned adjacent the other. The two rings are designed to be nested together. Each ring has a distinct coefficient of thermal contraction, so that when the nested rings are subjected to substantial temperature changes from ambient, the individual rings contract at different rates to cause not only a change in effective width of the nested rings but also a change in effective height of the nested rings. The rings are snugly contained within the housing or jacket, so that overall changes in the dimensions of the nested rings result in actual changes in the overall dimensions of the housing or jacket. Preferably, the housing or jacket includes a resilient ridge or protrusion on each of the upper and lower surfaces thereof. This configuration thus forces the ridges or protrusions into sealing contact with an adjacent component surface when the overall dimensions of the assembly changes.

Alternative embodiments contemplate alternate cross-sections for the actuators. Such sectional shapes include tear drop, oval, arcuate, round, or semi-circular.

For electrical applications, the jacket or housing is an electrically conductive material, or an electrically conductive coating applied directly to and carried by the actuators. Materials useful in this application include electrically conductive elastomers and piezoelectric materials.

Other objects, advantages, and novel features of the present invention will become apparent from the following detailed description of the invention when considered in conjunction with the accompanying drawings.

DETAILED DESCRIPTION OF THE INVENTION

Figure 1A:
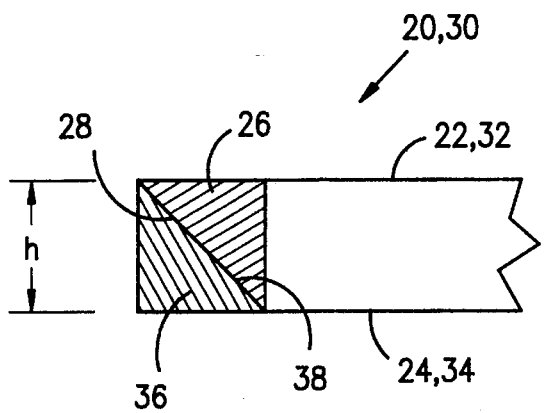
FIG. 1a is a partial sectional view of the sealing assembly actuator at ambient temperature.

Referring now to FIG. 1a of the drawings, the temperature-responsive actuator mechanism of the sealing assembly of the present invention is shown to include a first ring member 20 and a second ring member 30. Preferably the first ring member 20 comprises a first material having a first coefficient of thermal expansion, while the second ring member 30 comprises a second material having a different, coefficient of thermal expansion. Preferably, the first coefficient of thermal expansion is smaller than the second coefficient of thermal expansion.

Each of the ring members possess an upper surface (22,32), a lower surface (24,34), and a camming surface (28,38) disposed on a solid portion (26,36) located at the extreme radial region of the respective ring member. As shown in FIG. 1a, the solid portion 26 of ring member 20 exhibits a triangular cross-section, with a vertical wall 29 being located on the inner side of the solid portion 26. The solid portion 36 of ring member 30 also exhibits a triangular cross-section, with a vertical wall 39 being located on the outer side of the solid portion 36.

Figure 1B:
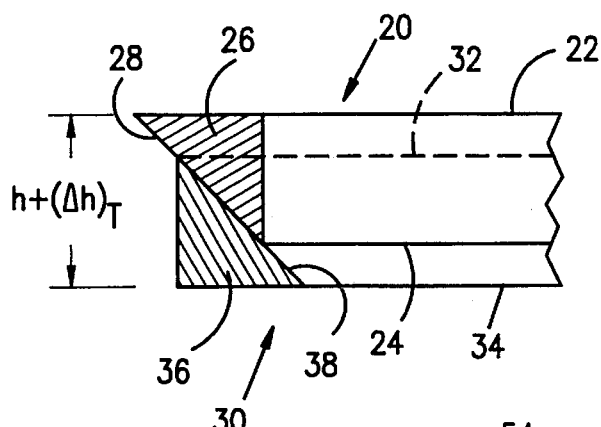
FIG. 1b is a partial sectional view of the sealing assembly actuator at a diminished temperature.

Referring now to both FIGS. 1a and 1b, the two ring members 20 and 30 are seen to be disposed relative to one another such that the camming surfaces 28 and 38 are juxtaposed, one with the other, and the two ring members are arranged so that one is nested one within the other. In this manner, when the ring members are exposed to an ambient temperature environment, they are positioned so that the overall diameter of the ring members is diameter "d" and the two solid portions combine to form a square section of height "h". When the temperature environment is lowered, the upper of the ring members contracts at a different rate than the rate of contraction of the lower ring member (i.e., as a function of the decreasing temperature). The ring members remain in nested relationship, but now the camming surfaces of the upper and lower ring members permit the lower ring member, which has a greater coefficient of thermal contraction, to contract at a faster rate than the upper ring member. Thus, the lower ring member camming surface moves under the upper ring member camming surface so that the overall "effective" diameter of the two, nested, ring members becomes "d−▲d" and the overall "effective" height of the two solid sections becomes "h+▲h".

The invention contemplates using the annular members shown in FIGS. 1a and 1b as the temperature-responsive actuator mechanism without more. The ring or annular members are configured to be maintained in their nested relationship by their interaction with the components that are in proximal contact with them.

Figure 2A:
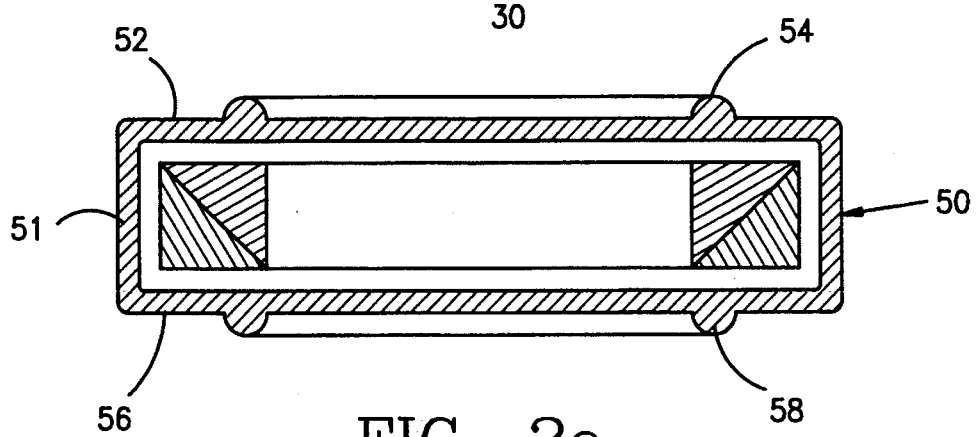
FIG. 2a is a sectional view of the sealing assembly in an ambient environmental temperature.
Figure 2B:
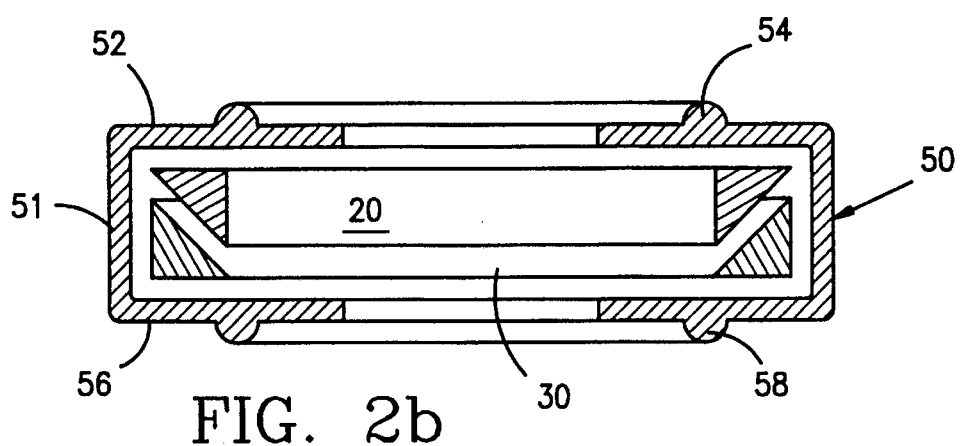
FIG. 2b is a sectional view of the sealing assembly in a diminished environmental temperature.

FIGS. 2a and 2b illustrate an alternative configuration in which a jacket or housing 50 surrounds the ring members and has an upper wall 52 including a portion covering the solid portions of the ring members, a lower wall 56 including a portion covering the solid portions of the ring members, and side walls 51 of a height greater than the height "h" of the combined ring members when they are at ambient temperature. Disposed on the upper and lower wall portions of the housing 52 are upraised protrusions 54,58 which are provided for engagement with surfaces of the structures located above and below the sealing mechanism. The protrusions transfer a greater sealing force to the structure surfaces created by the ring members of the actuator mechanism as the temperature is lowered below the ambient.

The upper and lower wall portions of the housing 52 may extend across the entire diameter of the ring members as shown in FIG. 2a, or they may include an opening located to the interior of the protrusions as shown in FIG. 2b.

In addition, the invention contemplates more than one annular protrusion disposed on the upper or the lower surface of the housing 52. Preferably, the jacket 52 of the invention comprises a plastic material, such as Teflon or filled Teflon, and may comprise an electrically conductive polymer, so that the protrusion(s) not only perform a sealing function, but also perform the function of making or maintaining electrical contact between two conductive components.

Figure 3:
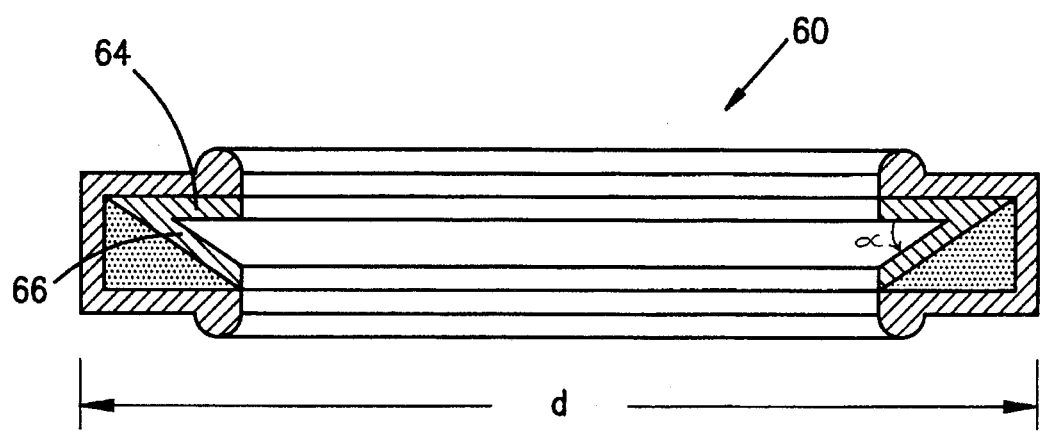
FIG. 3 is an alternate embodiment of the sealing assembly of the invention.

FIG. 3 depicts a variation 60 of the actuator members of the invention including the upper ring member which has been replaced with a spring element having an overall diameter "d". The spring element includes a first circular or annular, substantially horizontal, leg portion 64 and a second circular or annular, radially inwardly directed leg portion 66 which makes an acute angle ∝ with the first annular leg portion. The lower ring member is of the same configuration as described for the lower ring member shown in FIGS. 1a and 1b, and is comprised of a material having a coefficient of thermal contraction greater than that the upper spring element.

Figure 4:
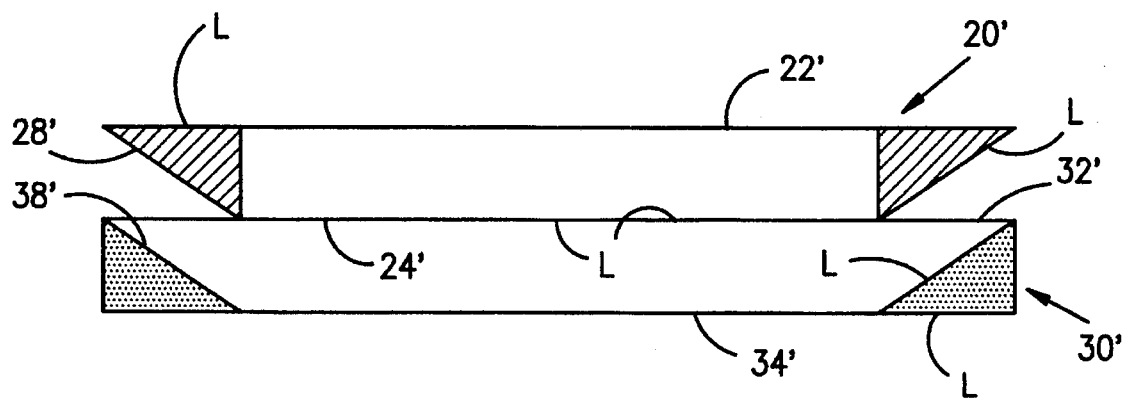
FIG. 4 is another alternate embodiment of the sealing assembly of the invention.
Figure 5:
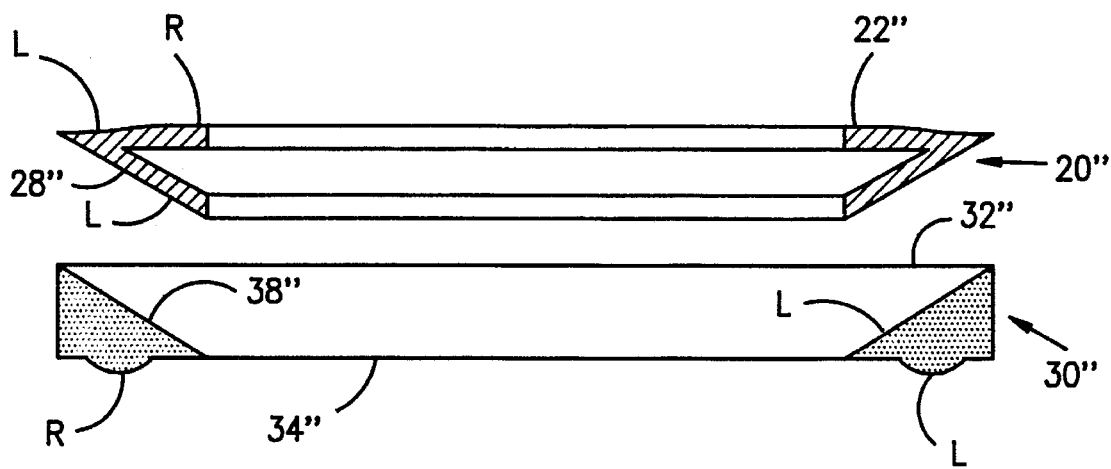
FIG. 5 is still another alternate embodiment of the sealing assembly of the invention.

FIGS. 4 and 5 illustrate other embodiments of the actuator mechanism of the invention. In FIG. 4, the upper and lower ring members 20',30' are nested and have cooperating camming surfaces 28',38' of the type and configuration shown in FIGS. 1a and 1b. However, in this embodiment, the actuator members are used together without a housing or jacket, and the ring members themselves are coated with a material layer L which enables additional compliance at cryogenic temperatures, as for example, Teflon, lead, gold and silver.

In FIG. 5, the upper and lower ring members 20",30" are nested and include cooperating camming surfaces of the type and configuration shown in FIGS. 1a and 1b. In this embodiment, however, one or both of the members are provided with an annular ridge R raised relative to the respective sealing surface of the member. The actuator members may be used together without a housing or jacket, and the ring members themselves can be coated with a material layer L which enables additional compliance at cryogenic temperatures, as for example, Teflon, lead, gold and silver.

The embodiments of FIGS. 3 and 5 make use of the resilient properties of the upper annular member to also achieve and/or maintain positive contact between the jacket (FIG. 3) or the sealing surface itself (FIG. 5) during relative movement between the component surfaces being sealed. The range of movements contemplated are within the deflection capabilities of the particular spring element used.

The range of temperatures at which the sealing assembly exhibits its range of optimum sealing capabilities is between ambient temperature and −459° F.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A thermally-responsive actuator for a sealing assembly, comprising:
   a first annular member having a first resilient leg portion including a horizontal load-bearing sealing surface and a second resilient leg portion disposed at an acute angle to said first leg portion and including a camming surface, said first and second leg portions being radially inwardly directed,
   a second annular member including a camming surface configured for engagement with the camming surface of said first annular member and a load-bearing sealing surface disposed parallel to said load-bearing sealing surface of said first annular member,
   said first and second annular members being positioned one against the other so that they are disposed in a nested relationship, and together exhibit a height "h" at ambient temperatures,
   said first annular member having a coefficient of thermal contraction that is less than the coefficient of thermal contraction of the second annular member,
   such that when said thermal actuator is subjected to temperatures less than ambient temperatures, the first and second annular members experience contractions of different amounts such that the overall height of said cooled actuator increases.

2. The actuator of claim 1, wherein said sealing surfaces include sealing ridges protruding away from said sealing surfaces for engagement with surfaces of components to be sealed.

3. The actuator of claim 1, and further including a coating on at least one of said annular members, said coating providing additional compliance of engaging surfaces when said annular members are subjected to temperatures below the ambient.

4. The actuator of claim 3, wherein said coating is provided on all of said annular members.

5. The actuator of claim 1, wherein said annular members are housed snugly within an annular jacket, said jacket including interior surfaces engaging said load-bearing sealing surfaces of said first and second annular members, said jacket further having exterior sealing surfaces disposed parallel with said interior surfaces.

6. The actuator of claim 5, wherein said jacket includes a ridge protruding from at least one of said sealing surfaces.

7. The actuator of claim 6, wherein said jacket includes a ridge protruding from both of said sealing surfaces.

8. The actuator of claim 5, wherein said jacket comprises an electrically conductive material.

9. The actuator of claim 6, wherein said ridge comprises said electrically conductive material.

10. The actuator of claim 7, wherein said ridges comprise said electrically conductive material.

11. The actuator of claim 1, wherein said first and second resilient legs of said first annular member intersect at, and are integrally attached to, a solid annular portion having a triangular cross-sectional configuration.

* * * * *